(12) United States Patent
Gansloser et al.

(10) Patent No.: US 7,399,250 B2
(45) Date of Patent: Jul. 15, 2008

(54) ALL-WHEEL DRIVE TRAIN

(75) Inventors: Philip Gansloser, Bad Ditzenbach (DE); Tobias Haerter, Fellbach (DE); Werner Klein, Winnenden (DE); Hartmut Nied, Waiblingen (DE); Rolf Schroeder, Stuttgart (DE); Petra Tennert, Gerlingen (DE)

(73) Assignee: Daimler AG, Stuttgart (DE)

( * ) Notice: Subject to any disclaimer, the term of this patent is extended or adjusted under 35 U.S.C. 154(b) by 223 days.

(21) Appl. No.: 11/337,230

(22) Filed: Jan. 20, 2006

(65) Prior Publication Data
US 2006/0150766 A1 Jul. 13, 2006

Related U.S. Application Data

(63) Continuation-in-part of application No. PCT/EP2004/008142, filed on Jul. 21, 2004.

(30) Foreign Application Priority Data
Jul. 25, 2003 (DE) .................... 103 33 945

(51) Int. Cl.
F16H 48/20 (2006.01)
(52) U.S. Cl. .............. 475/249; 475/198; 475/200; 475/248; 180/233; 180/247; 180/248; 180/249; 180/250
(58) Field of Classification Search ............. 475/198, 475/200, 248, 249
See application file for complete search history.

(56) References Cited

U.S. PATENT DOCUMENTS

| 2,185,636 A | * | 1/1940 | Kysor | ................ 180/249 |
|---|---|---|---|---|
| 4,420,059 A | * | 12/1983 | Suzuki | ................ 180/248 |
| 4,484,654 A | | 11/1984 | Hayakawa | |
| 4,729,450 A | | 3/1988 | Morisawa et al. | |
| 4,771,852 A | | 9/1988 | Nishikawa et al. | |
| 4,827,807 A | | 5/1989 | Hayakawa et al. | |
| 4,860,612 A | * | 8/1989 | Dick et al. | ................ 74/665 H |
| 5,226,860 A | * | 7/1993 | Baxter et al. | ................ 475/206 |
| 6,805,651 B2 | * | 10/2004 | Lipman | ................ 475/221 |
| 7,021,168 B2 | * | 4/2006 | Burkle et al. | ................ 74/325 |
| 2002/0128117 A1 | * | 9/2002 | Schroder et al. | ................ 477/72 |

FOREIGN PATENT DOCUMENTS

| DE | 42 35 683 | 6/1995 |
|---|---|---|
| EP | 0 531 088 | 3/1993 |
| EP | 0 636 506 | 2/1995 |
| EP | 1 036 691 | 9/2000 |
| EP | 1 238 847 | 9/2002 |
| EP | 1 273 473 | 1/2003 |
| JP | 09 095152 | 4/1997 |

* cited by examiner

Primary Examiner—David D. Le
(74) Attorney, Agent, or Firm—Klaus J. Bach

(57) ABSTRACT

In an all-wheel drive train for a motor vehicle wherein the drive torque of the engine of the motor vehicle is transmitted from the transmission output shaft partially to the rear axle and partially to the front axle via an offset transmission structure and a laterally arranged drive shaft extending from the offset transmission structure past the transmission to the front axle of the motor vehicle extends from the offset transmission forwardly at a certain opening angle in close proximity to the transmission structure which narrows down toward the rear so that the rear end of the lateral drive shaft is relatively close to the center axis of the transmission.

7 Claims, 1 Drawing Sheet

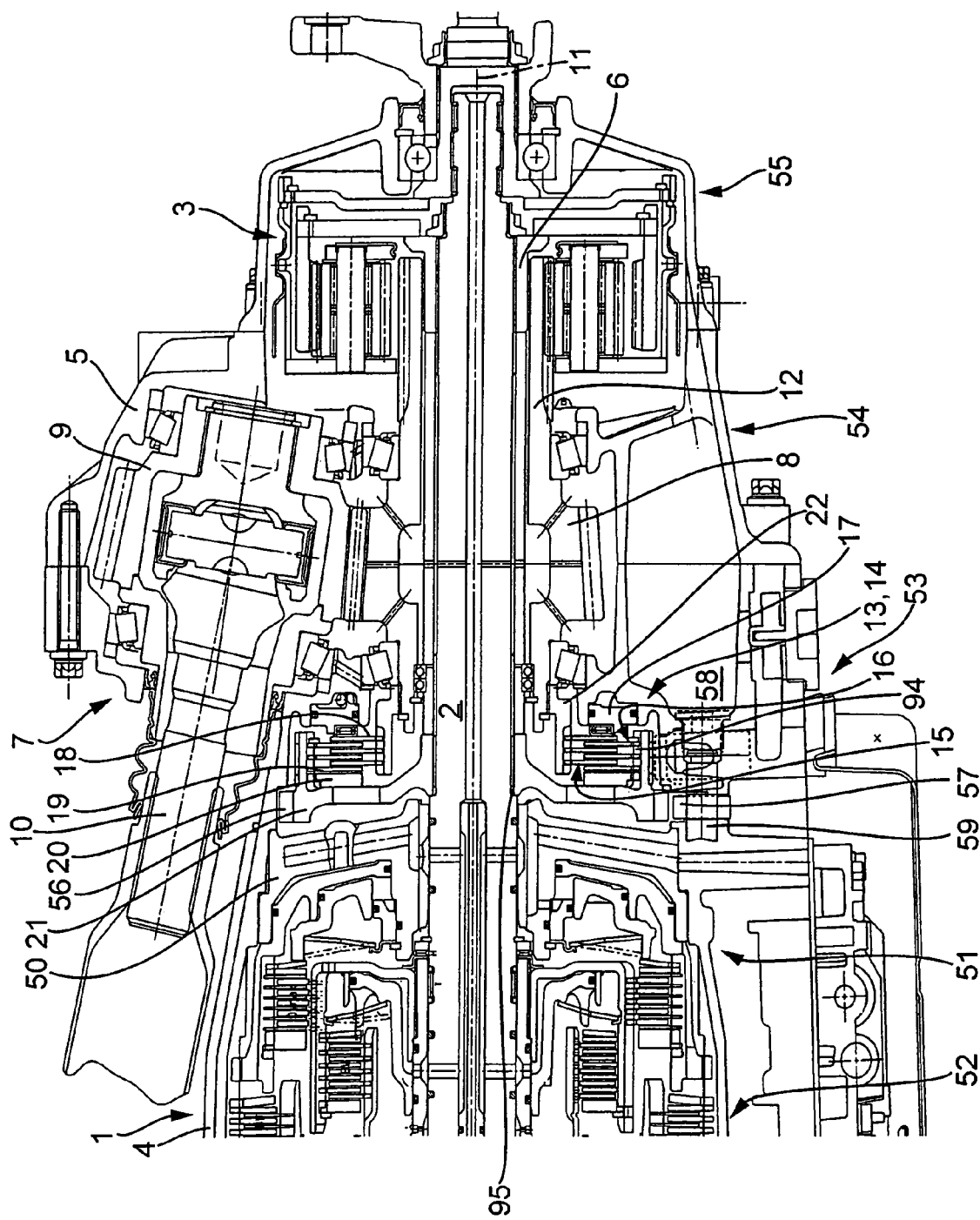

ALL-WHEEL DRIVE TRAIN

This is a Continuation-in-Part Application of International application PCT/EP2004/008142 filed Jul. 21, 2004 and claiming the priority of German application 103 33 945.0 filed Jul. 25, 2003.

BACKGROUND OF THE INVENTION

The invention relates to an all-wheel drive train with an engine mounted longitudinally in a motor vehicle including a transfer gear for transferring part of the engine output torque to the front wheels via a side shaft extending from the transfer gear past the engine to the front axle of the vehicle.

EP 1 238 847 A1 discloses an all-wheel drive train in which an engine and a transmission adjoining the engine are installed in the longitudinal direction of the vehicle and some of the drive torque is transmitted to a rear axle via a drive shaft and a rear-axle differential transmission. Another part of the drive torque is transmitted via an angled gear pair to a lateral shaft which is directed to the front axle past the transmission at a certain opening angle relative to the longitudinal axis of the vehicles.

The basic concept of such an all-wheel drive train is well-known for example from EP 1 273 473 A1.

It is the object of the present invention is to integrate a clutch in such an all-wheel drive train, which clutch can be designed, for example, as a central differential lock or as a Bonanza effect element, that is, a torque shock damping device.

SUMMARY OF THE INVENTION

In an all-wheel drive train for a motor vehicle wherein the drive torque of the engine of the motor vehicle is transmitted from the transmission output shaft partially to the rear axle and partially to the front axle via an offset transmission structure and a lateral drive shaft extending from the offset transmission structure past the transmission to the front axle of the motor vehicle extends from the offset transmission forwardly at a certain opening angle in close proximity to the transmission structure which narrows down toward the rear so that the rear end of the lateral drive shaft is relatively close to the center axis of the transmission.

Preferably, the diameter of the clutch is smaller than the diameter of the components of the transmission which are disposed at the rear in the direction of travel. It is thus possible in an especially advantageous manner to direct the lateral shaft forward past the transmission at a close distance apart.

It is also advantageous if the diameter of the clutch is larger than the diameter of the drive component, which may be designed as the drive pinion of a gear pair. The larger the diameter of the clutch, the higher the torque that can be transmitted by the clutch. If the clutch is a frictional multi-disk clutch, only a few disks need to be used because a high torque can be transmitted by such a clutch. This also results in cost advantages and construction-space advantages. If the clutch is designed as a positive-locking clutch, it can be small because there is no need to transfer the torque by friction forces via large-diameter clutch plates. For example, the positive-locking clutch may be designed with an unhardened tooth system. As a result of the low forces, the positive-locking clutch may also be a lightweight aluminum casting.

A frictional multi-disk clutch can be
a) a torque shock damping clutch that is a "Bonanza effect" element, which dampens shocks in the drive train, and also b) an infinitely variable central differential locking structure, with which the possible speed difference between front axle and rear axle can be adjusted toward zero in an infinitely variable manner, and also as
c) a multi-disk transfer clutch, with which the front axle can be coupled to the drive shaft of the transmission in an infinitely variable manner if required.

In the latter case c), the coupling of the front axle to the drive torque transmission can be made dependent upon the speed differences between the front axle and the rear axle. Furthermore, the vehicle driver can determine by pushbutton pressure whether he desires the off-road all-wheel drive on a surface which is wet from rain, ground covered with snow, or slippery ground, or whether he desires to use the fuel-saving rear-axle drive only.

There is also a possibility of integrating a transmission brake or transmission lock by means of clutch, which transmission brake or transmission lock may be designed, for example, as a parking lock or as a hill holder. If the parking lock or hill holder shares an axial plane with the axially offset transmission especially space-saving possibility of integrating an actuator for the transmission brake or transmission lock are obtained.

In an especially advantageous embodiment an epicyclic transmission is used in the all-wheel drive train. Epicyclic transmissions, based on the transmission scheme, are symmetrical with respect to a central axis, in the same way as the clutch connected on the output side of the transmission, in contrast to counter shaft transmissions. All-wheel drives normally have high drive torques. In the epicyclic transmission, the high forces effective at the transmission gear teeth as a result of the high drive torques are absorbed in the various planet sets of the transmission and are not transmitted to the transmission housing, so that transmission housings constructed of light alloys—even magnesium alloys—may be used. Thus an epicyclic transmission, in addition to the toroidal transmission with coaxial branching of the torque, is especially suitable for the use according to the invention. Such a toroidal transmission with coaxial branching of the output is described, for example, in DE 102 06 202 A1.

The invention will become more readily apparent from the following description of an exemplary embodiment with reference to the accompanying drawing.

BRIEF DESCRIPTION OF THE DRAWING

The sole FIGURE shows part of a longitudinally installed all-wheel drive train for a motor vehicle.

DESCRIPTION OF A PREFERRED EMBODIMENT

The all-wheel drive train has a transmission 1 which includes an output shaft 2 pointing toward the rear of the motor vehicle in the installed state. This transmission output shaft 2 forms the input shaft 6 of the central differential 3.

The automatic transmission 1 has a transmission housing 4 with an integrally formed bearing housing 5 for a lateral output 7, so that the automatic transmission 1 can be used cost-effectively according to the "add-on principle" for an all-wheel variant.

In such an all-wheel variant, the transmission output shaft 2 which is extended compared with the pure rear-drive variant or the input shaft 6 is connected via the central differential 3 and a rear-drive cardan shaft to a pinion shaft of a rear-axle transmission (not shown) in such a way that a first portion of the drive torque is transmitted to the rear-axle transmission. A second portion of the drive torque is transmitted to a front axle by the input shaft 6 via
- the central differential 3,
- a drive pinion 8,
- an output pinion 9,
- an articulated lateral shaft 10 of the lateral output 7, and
- a bevel pinion shaft of a front-axle transmission (not shown).

By means of the central differential 3, output torques can be distributed to the front-axle transmission and the rear-axle transmission and speed differences can be compensated for.

The lateral shaft 10 of the lateral output 7 is directed to the front axle past the automatic transmission 1 at a certain opening angle. To this end, the lateral shaft 10 is angled horizontally by an angle of about 8° relative to the drive-train longitudinal axis 11 and is angled vertically by an angle of about 4° relative to the drive-train longitudinal axis 11.

The lateral output 7 is formed by a gear pair 8/9 which functionally forms an axially offset transmission with reversal of the direction of rotation and comprises the drive pinion 8 and the output pinion 9 meshing with the latter. The drive pinion 8 is connected in a rotationally fixed manner to a hollow shaft 12 which is formed integrally with a sun gear of the central differential 3. The transmission output shaft 2 and the input shaft 6 extend inside this hollow shaft 12. The output pinion 9 is in principle a hollow, externally toothed shaft which is mounted by means of a set of tapered roller bearing in x arrangement in the bearing housing 5.

To permit the shaft to assume the proper angles, the lateral shaft 10 is arranged in an articulated manner radially inside the output pinion 9 by means of a universal joint. Furthermore, in the direction of travel at the front, i.e. at its other end, the lateral shaft 10 is coupled in an articulated manner by means of a further universal joint to the bevel pinion shaft of the front-axle transmission.

In the all-wheel drive train, the drive pinion 8 and the output pinion 9 meshing therewith are straight bevel gears. The lateral shaft 10 is arranged on the right side of the automatic transmission 1 in the direction of travel and extends past the transmission housing 4 at a small distance therefrom. In this case, the lateral shaft 10 passes
- first a controllable differential clutch 13,
- then a dividing wall 50,
- then the components 51 of the automatic transmission 1 which are disposed at the rear end of the transmission,
- then the components 52 of the automatic transmission 1 which are disposed further to the front,
- then a driving engine which is installed longitudinally and is flange-mounted to the automatic transmission 1.

Finally, the lateral shaft 10 consists via the bevel pinion shaft to the front-axle differential transmission, the housing of which is screwed to an oil sump housing of the driving engine. In this case, the housing of the front-axle transmission and the oil sump are designed as an aluminum die casting.

The controllable differential locking structure 13 for the central differential 3 is additionally designed as a Bonanza effect element or slip clutch. The differential lockup structure 13 is arranged directly adjacent to the automatic transmission 1 between the latter and the drive pinion 8, the differential locking structure being separated from the rear components 51 of the automatic transmission 1 by means of the dividing wall 50.

The transmission housing 4 with the integrally formed bearing housing 5 is in this case split into three parts, all three housing parts 53, 54, 55 being used only in the all-wheel variant shown. The foremost housing part 53 accommodates the components 51, 52 of the automatic transmission 1,
- the differential locking structure 13 separated from the latter by means of the dividing wall 50, and
- the front part of the axially offset transmission.

The center housing part 54 accommodates the rear part of the axially offset transmission. The rear housing part 55 accommodates the central differential 3.

The differential locking structure 13 comprises a multi-disk clutch 14, by means of which
- the hollow shaft 12 or
- the sun gear of the central differential 3 or
- the drive pinion 8 can be coupled frictionally in a rotationally fixed manner or in a friction-torque-transmitting manner to
- the transmission output shaft 2 or
- the input shaft 6 or
- the ring gear of the central differential 3.

To regulate the transmitted friction torque between two clutch halves 15, 16 of the differential locking structure 13, the two clutch halves 15, 16 can be pressed axially against one another by means of an annular control piston 17. In this case, the control piston 17 is supported axially on one side on the front housing part 53 and on the other side via an axial rolling-contact bearing on a disk 18 of the first clutch half 15. Axially following this disk 18 in an alternating manner in the direction pointing forward are the other disks of the two clutch halves 15, 16, an abutment disk 20 adjoining the last disk 19 of the second clutch half 16, this abutment disk 20 bearing axially against a support pot 21 of cast aluminum, which is connected to the transmission output shaft 2 in a rotationally fixed manner by means of a splined-shaft tooth system. This support pot 21 is provided with an external tooth system 56 and is supported in the forward direction on a step of the transmission output shaft 2, so that all the disks of the differential locking structure 13 are engaged with one another in the force flow between the transmission housing 4 and the transmission output shaft 2 when the control piston 17 is disengaged. In addition to the splined-shaft internal tooth system 95 for the rotationally fixed connection to the transmission input shaft 2, the support pot 21 has an internal tooth system 94 for the rotationally fixed and axially displaceable connection to the disks of the second clutch half 16. To this end, the disks of the second clutch half 16 have, at their outer edge region, an external tooth system which engages in the internal tooth system of the support pot 21.

At the internal edge region, the disks of the first clutch half 15 have an internal tooth system which transmits the torque in a positive-locking manner to an externally helically toothed socket 22 which is arranged on the front end of the hollow shaft 12 in a rotationally fixed manner by means of a splined-shaft tooth system. The socket 22 is supported on the one side at the front end of the transmission output shaft 2 on an axial locking ring. On the other side, the socket 22 is supported on a bearing inner ring of the tapered roller bearing which carries the drive pinion 8.

Arranged radially outside the support pot 21 is a parking lock catch 57, so that the latter can engage in a tooth gap of the external tooth system 56 and stop the support pot 21. To this end, the parking lock catch 57, which can be pivoted radially inward, can be actuated by means of a parking lock actuator, the piston rod 59 of which is displaceable parallel to the drive-train longitudinal axis 11. The parking lock actuator itself is arranged inside the transmission housing 4 in a space 58 below the drive pinion 8, this space 58 thus lying axially in the same position as the axially offset transmission. This region of the all-wheel drive train is therefore effectively utilized.

Starting from the drive pinion 8, the diameter of the individual components increases in the forward direction. Thus, the outside diameter of the annular control piston 17 is smaller than the outside diameter of the externally toothed disks, which in turn

- is smaller than the outside diameter of the support pot 21, which in turn
- is smaller than the outside diameter of the external tooth system 56, which in turn
- is smaller than the outside diameter of the dividing wall 50, which in turn
- is smaller than the outside diameter of the rear components 51 of the automatic transmission 1, which in turn
- is smaller than the outside diameter of the following components 52 of the automatic transmission 1.

The front housing part 53 of the transmission housing 4 can thus have a wall of uniform thickness, and can therefore be produced without shrinkage cavities even from a magnesium alloy without any problems, and the lateral shaft can extend forward to the front axle in close proximity to the transmission housing.

Instead of a gear pair, a toothed belt drive or a chain drive may also be provided as lateral output or axially offset transmission structure, the fact that there is no reversal of the direction of rotation however needs to be taken into account in the design of the front-axle transmission.

The lateral shaft does not need to be provided with joints. In particular, if the distance between the lateral output and the front axle is short, joints may be omitted.

What is claimed is:

1. An allwheel drive train for a drive engine of a motor vehicle having a transmission (1) adjoining said drive engine and being installed together with the engine in the longitudinal direction of the motor vehicle, said all wheel drive train transmitting at least a portion of the drive torque of the engine from a transmission output shaft (2) via an axially offset transmission structure to a lateral drive shaft (10), said drive train including at the output end of the transmission (1) a clutch (14) arranged axially between the transmission output shaft and a drive component (8) of the axially offset transmission structure, the clutch selectively connecting the transmission output shaft with the drive component such that a torque can be selectively transmitted between the drive component (B) and the transmission output shaft (2), the lateral drive shaft (10) extending to a front axle of the motor vehicle past the transmission (1) at a certain opening angle, the clutch (14) having a diameter which is smaller than the diameter of a components (51) of the transmission (1) which is disposed in the direction of vehicle travel at the rear of the transmission, but ahead of the clutch (13) and is larger in outer diameter than the drive component (8) which is arranged after the clutch (14) so that the transmission narrows down toward the drive component (8) and the rear end of the lateral drive shaft (10) can be arranged in close proximity to the longitudinal transmission axis.

2. The allwheel drive train as claimed in claim 1, wherein the drive component (8) is the drive pinion of a gear pair.

3. The all-wheel drive train as claimed in claim 1, wherein the clutch (14) is a multi-disk clutch.

4. The all-wheel drive train as claimed in claim 1, wherein an actuator is provided for locking a clutch part (21) connected to the transmission output shaft (2) in a rotationally fixed manner (parking lock).

5. The allwheel drive train as claimed in claim 4, wherein the actuator is disposed in a common axial plane with the axially offset transmission.

6. The all-wheel drive train as claimed in claim 5, wherein a central differential (3) is arranged adjacent the drive component (8).

7. The allwheel drive train as claimed in claim 5, wherein the actuator is movable parallel to a drive-train longitudinal axis (11).

* * * * *